Sept. 22, 1964     T. C. ANDERSON ETAL     3,150,268
BATTERY SWITCHING CIRCUIT
Filed Oct. 1, 1962
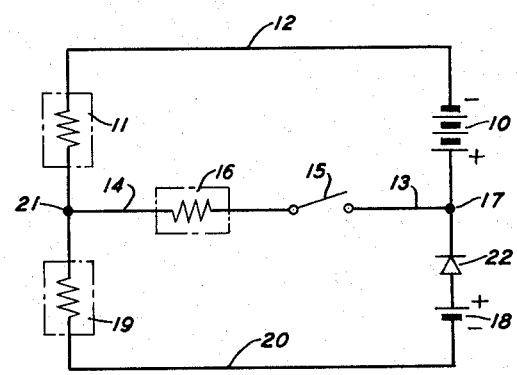
INVENTORS T. C. ANDERSON
         D. L. FAVIN
BY
       Patrick J. Rocke
              ATTORNEY

United States Patent Office 3,150,268
Patented Sept. 22, 1964

3,150,268
BATTERY SWITCHING CIRCUIT
Theodore C. Anderson, Morristown, and David L. Favin, Whippany, N.J., assignors to Bell Telephone Laboratories, Incorporated, New York, N.Y., a corporation of New York
Filed Oct. 1, 1962, Ser. No. 227,208
5 Claims. (Cl. 307—12)

This invention relates to a switching arrangement for interconnecting a plurality of sources of direct-current voltage and a plurality of loads in circuit via a common branch, and more specifically to such arrangement including unidirectional conductive means for substantially electrically isolating the voltage sources from each other when the switching arrangement disconnects the voltage sources from the loads.

In the packaging of electrical testing equipment, it is a practice to provide minimum weight and bulk by incorporating transistors in the associated circuits and simplifying the overall circuits whenever feasible by assigning multiple circuit functions to certain devices such, for example, as switches. This reduces the quantity of such devices thereby tending to add to the portability of the equipment. Since transistors involve small power requirement, dry-cell batteries are usually employed for activating the testing circuits. As such batteries have a relatively short life to begin with, it is imperative to design the switching circuits for obtaining the aforementioned characteristics, without permitting any unnecessary current drain on the batteries when they are disconnected from their loads.

The present invention contemplates the use of an arrangement adapted to minimize current flow in a circuit including a plurality of dry-cell batteries and a plurality of loads effectively connected in a series circuit when such circuit is normally considered to be in an inoperative state.

A principal object of the invention is to isolate electrically two dry-cell batteries effectively interconnected in a series circuit when such circuit is normally adjusted to an inoperative state.

It is another object to disconnect effectively multiple batteries from each other in a series circuit when such circuit is normally deemed to be in an inoperative state thereby tending to minimize current flow in the circuit.

It is a further object to minimize current flow in a series circuit effectively including multiple dry-cell batteries and loads when such circuit is adjusted to an inoperative state.

In association with multiple loads, multiple dry-cell batteries of different voltages and a single-pole single-throw switch for connecting the loads and batteries in circuit so that the switch is located in a common branch, a specific embodiment of the present invention comprises unidirectional conductive means connected in the circuit between the two batteries and poled for conduction in the direction from the battery of the smaller voltage toward the battery of the larger voltage. The unidirectional means serves to isolate electrically the two interconnected batteries from each other when the switch is operated to disconnect the batteries from their respective loads for placing the circuit in an inoperative state, although the batteries and loads are effectively connected in a series circuit. This tends to minimize current drawn from the battery of the larger voltage in the series circuit when the overall circuit is deemed to be in the inoperative state.

In a modification a third load may be included in series with the switch in the common branch.

A feature of the invention is the use of a unidirectional conductive means comprising a diode rectifier connected between terminals of the like polarity of the two batteries and poled for conduction in the direction from the like polarity terminal of the battery of the smaller voltage toward like polarity terminal of the battery of the larger voltage. This rectifier serves to isolate electrically the two batteries from each other although they are effectively interconnected in a series circuit through their respective loads, when the switch is operated to disconnect the two batteries from their respective loads for placing the circuit in the inoperative state.

These and other objects of the invention will be readily understood from the following description taken together with the accompanying drawing which is a schematic circuit illustrating a specific embodiment of the invention.

Referring to the drawing, it is seen that a source 10 of unidirectional current voltage having a magnitude say, for example, of 30 volts is connectable in circuit with a first load 11 via leads 12, 13 and 14 and a single-pole single-throw switch 15. A source 18 of unidirectional current voltage having a magnitude say, for example, of 7 volts is connectable in circuit with a second load 19 via leads 13, 14 and 20 and the switch. Each of the voltage sources may comprise a dry-cell battery.

When the switch is closed, current flows in a circuit comprising the positive terminal of source 10, common point 17, lead 13, closed switch 15, lead 14, load 11 and lead 12 back to the negative terminal of source 10. At the same time, current also flows in another circuit including the positive terminal of source 18, common point 17, lead 13, closed switch 15, lead 14, load 19 and lead 20 back to the negative terminal of source 18. It is thus seen that point 17, lead 13, switch 15 and lead 14 are included in a branch common to the flow of current in two previously traced circuits.

If desired, a third load 16 may be connected in lead 14, for example, in the aforenoted common branch in series with the switch and provided with a terminal 21 common to adjacent terminals of loads 11 and 19. Now, current from both voltage sources 10 and 18 flows in the third load 16, as well as in loads 11 and 19, in the two above identified circuits, including the common branch when the switch is closed.

It is therefore apparent that the closure of the switch connects the two batteries in circuit with their associated loads at the same time, and the opening of the switch disconnects the two batteries from their respective loads, as well as from the third load, at the same time. It is further apparent that when the switch is opened to disconnect the sources from the respective loads, the two voltage sources remain effectively connected in a series circuit comprising the positive terminal of source 10, common terminal 17, source 18, lead 20, loads 19 and 11, and lead 12 back to the negative terminal of source 10. It has been found that the voltage source 10 tends to drive current therefrom through the last-traced series circuit. This provides an unnecessary current drain on source 10 when the overall circuit is deemed to be in an inoperative state.

In accordance with a specific embodiment of the present invention, unidirectional conductive means comprising, as one example, a rectifier 22 is connected between the positive terminals of the sources 10 and 18 and poled for conduction in the direction from the positive terminal of source 18 toward the positive terminal of source 10 and common terminal 17. Thus, the anode of the rectifier is connected to the positive terminal of source 18 while its associated cathode is connected to the common terminal 17 and positive terminal of source 10. Now, when the switch is opened, the rectifier is effectively back-biased by the voltage of source 18 and is thereby caused to present effectively a resistance of large magnitude relative to the voltage of source 10. This large resistance tends to isolate the two batteries from each other and at the same time to minimize substantially current flow effected by voltage source 10 in the previously identified series circuit including batteries 10 and 18, common point 17, leads 20 and 12, and loads 19 and 11, when the overall circuit is placed in the inoperative state by the opening of the switch. This isolation of the two batteries tends to minimize unnecessary current drain from source 10.

When the switch is closed, however, the rectifier is biased in the forward direction by the voltage of source 18 to present effectively a resistance of low magnitude relative to the voltage of source 18. This enables an expeditious flow of current in a circuit including the positive terminal of source 18, rectifier 22, common terminal 17, lead 13, closed switch 15, lead 14, load 16 when used, load 19 and lead 20 back to the negative terminal of source 18. At the same time, current flow is effective in the circuit including the positive terminal of voltage source 10, common terminal 17, lead 13, closed switch 15, lead 14, load 16 when used, load 11 and lead 12 back to the negative terminal of source 10. It is thus apparent that the rectifier does not impair the magnitude of the current flow from either of the two sources to the respective loads. Thus, when the switch is closed, the rectifier permits each source to function independently of the other regarding their respective loads and the common load. While the foregoing description illustrates the use of a solid-type rectifier, it is obvious that any unidirectional device known to the art may be substituted therefor without impairing the above-described circuit operation.

It is to be understood that the above-described arrangements are illustrative of the application of the principles of the invention. Numerous other arrangements may be devised without departing from the spirit and scope of the invention.

What is claimed is:

1. In combination with an electrical circuit including a plurality of loads, a plurality of sources of unidirectional voltage of different magnitudes, switching means, and circuit means to interconnect said loads, sources and switching means in said circuit in such manner that each load is connectible to one source through a common branch including said switching means and further in such manner that said switching means and like terminals of said sources have a common point, said source of larger voltage magnitude tending to drive current in a further circuit including said point, sources and loads in series when said switching means is opened to place said circuit in an inoperative state, unidirectionally conductive means included in said circuit means between said common point and the like polarity terminal of said source of the smaller voltage magnitude and poled for conduction in the direction from said last-mentioned source toward said common point thereby substantially electrically isolating said sources when said switching means is opened.

2. The combination according to claim 1 in which said switching means comprises a single-pole single-throw switch.

3. The combination according to claim 1 which includes another load connected in series with said switching means in said common branch and has a terminal common to adjacent terminals of said first-mentioned loads.

4. The combination according to claim 1 in which said unidirectionally conductive means comprises a rectifier device having an anode and a cathode, said anode connected to the like polarity terminal of said smaller voltage source and said cathode to said common point.

5. The combination according to claim 1 in which said sources comprise dry-cell batteries, said switching means comprises a single-pole single-throw switch, another load is connected in series with said switch in said common branch and has a terminal common to adjacent terminals of said first-mentioned loads, and said unidirectionally conductive means comprises a rectifier device having an anode and a cathode, said anode connected to the like polarity terminal of said battery of the smaller voltage magnitude and said cathode to said common point, the voltage of said last-mentioned battery back-biasing said rectifier to constitute effectively a resistance of large magnitude relative to the voltage of said larger voltage battery for substantially electrically isolating said last-mentioned battery from said smaller voltage battery when said switch is opened, the voltage of said smaller voltage battery forward-biasing said rectifier to constitute effectively a resistance of small magnitude relative to the voltage of said last-mentioned battery for unaffecting current flow from said last-mentioned battery in said common branch including said other load when said switch is closed.

No references cited.